US009820313B2

(12) United States Patent
Kashimba et al.

(10) Patent No.: US 9,820,313 B2
(45) Date of Patent: Nov. 14, 2017

(54) MEDIATION OF A COMBINED ASYNCHRONOUS AND SYNCHRONOUS COMMUNICATION SESSION

(71) Applicant: Bandwidth.com, Inc., Raleigh, NC (US)

(72) Inventors: Jared Kashimba, Micanopy, FL (US); Sai Rathnam, Raleigh, NC (US)

(73) Assignee: Republic Wireless, Inc., Raleigh, NC (US)

( * ) Notice: Subject to any disclaimer, the term of this patent is extended or adjusted under 35 U.S.C. 154(b) by 129 days.

(21) Appl. No.: 14/860,845

(22) Filed: Sep. 22, 2015

(65) Prior Publication Data

US 2016/0014164 A1    Jan. 14, 2016

Related U.S. Application Data

(60) Provisional application No. 62/183,923, filed on Jun. 24, 2015.

(51) Int. Cl.
*H04W 76/02* (2009.01)
*H04L 29/06* (2006.01)
*H04W 80/04* (2009.01)

(52) U.S. Cl.
CPC ......... *H04W 76/02* (2013.01); *H04L 65/1089* (2013.01); *H04W 80/04* (2013.01)

(58) Field of Classification Search
None
See application file for complete search history.

(56) References Cited

U.S. PATENT DOCUMENTS

2002/0051463 A1*  5/2002  Higuchi ............ H04L 29/06027
                                                370/466
2003/0065715 A1*  4/2003  Burdick, Jr. ............ H04L 67/04
                                                709/203

(Continued)

FOREIGN PATENT DOCUMENTS

GB          2499261 A  *  8/2013  ....... H04N 21/23602

*Primary Examiner* — Yemane Mesfin
*Assistant Examiner* — Peter Chen
(74) *Attorney, Agent, or Firm* — Gregory Stephens

(57) ABSTRACT

Disclosed are techniques for mediating a communication session between a communication device operating asynchronously and a communication device operating synchronously. A communications server receives a first set of audio data segments transmitted asynchronously from an asynchronous communication device over a first communication link and converts the audio data segments into a first synchronous stream of audio data. The communications server then establishes a synchronous audio media channel between itself and the synchronous device over a second communication link before transmitting the first synchronous stream of audio data to the second communication device over the established synchronous audio media channel. The communications server may also receive a second synchronous stream of audio data from the synchronous communication device and convert the second synchronous stream of audio data into a second set of audio data segments. The second set of audio data segments may then be transmitted asynchronously to the asynchronous communication device over the first communication link.

24 Claims, 8 Drawing Sheets

(56) References Cited

U.S. PATENT DOCUMENTS

| | | | |
|---|---|---|---|
| 2004/0019700 A1* | 1/2004 | Ilan | H04L 29/06027 709/249 |
| 2004/0131080 A1* | 7/2004 | Ito | H04L 29/06 370/466 |
| 2005/0198096 A1* | 9/2005 | Shaffer | H04L 12/581 709/200 |
| 2009/0245267 A1* | 10/2009 | Igarashi | H04N 21/41407 370/401 |
| 2010/0189127 A1* | 7/2010 | Suzuki | H04J 3/0641 370/465 |
| 2014/0044125 A1* | 2/2014 | Rathnam | H04L 65/1069 370/352 |
| 2015/0029881 A1* | 1/2015 | Finlayson | H04L 41/5038 370/252 |
| 2015/0156326 A1* | 6/2015 | Lv | H04L 65/1069 370/352 |

* cited by examiner

100

400

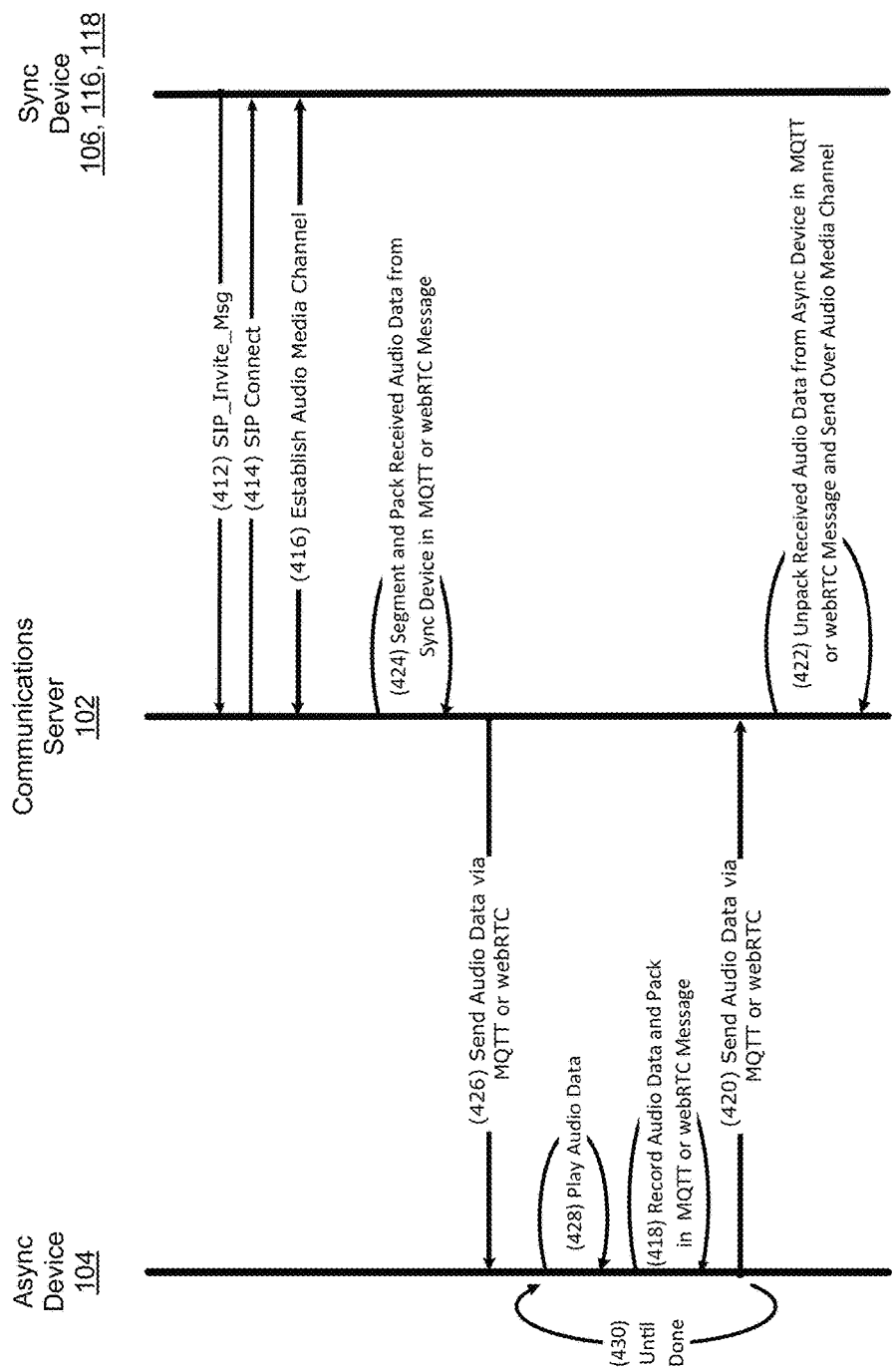

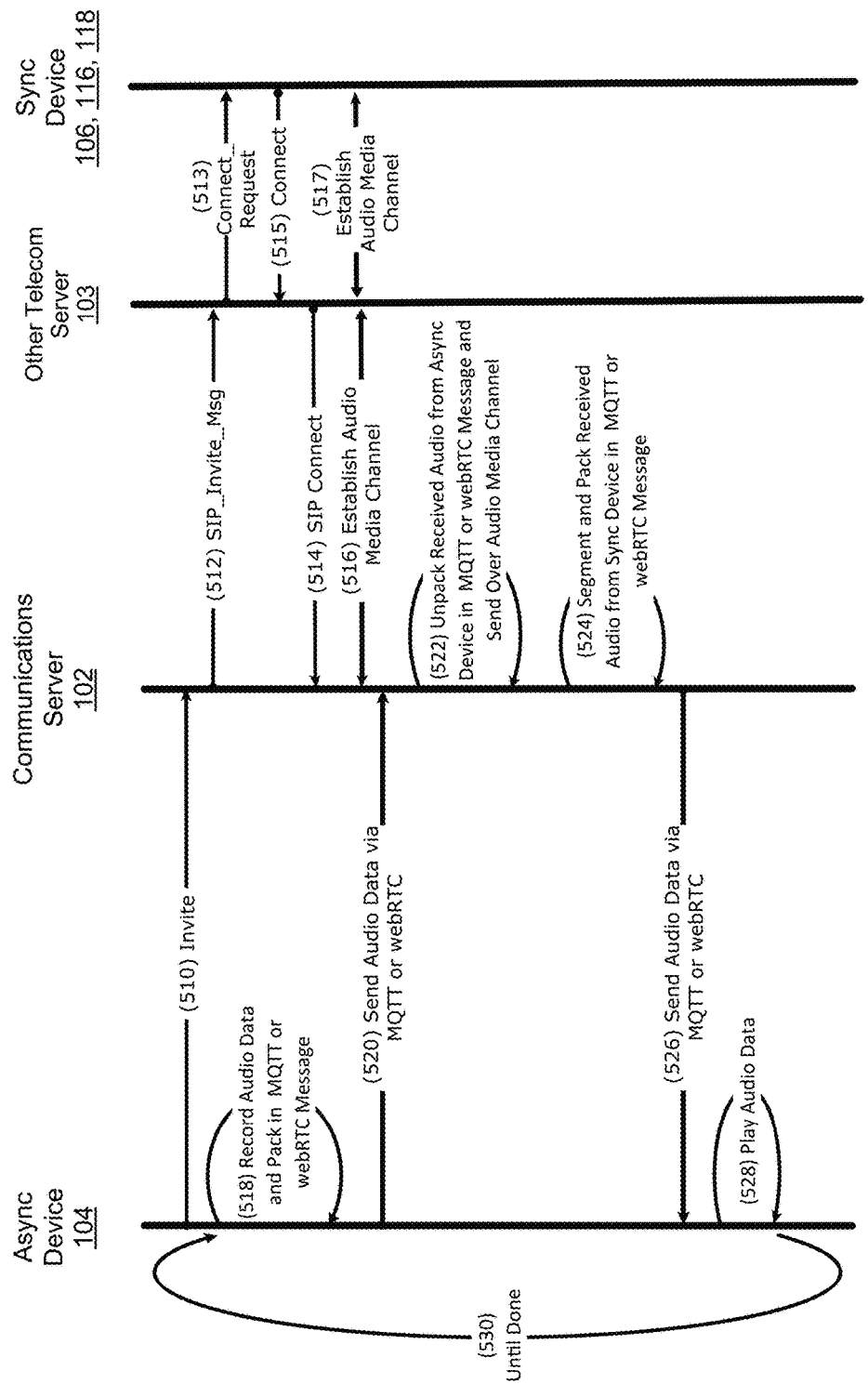

550

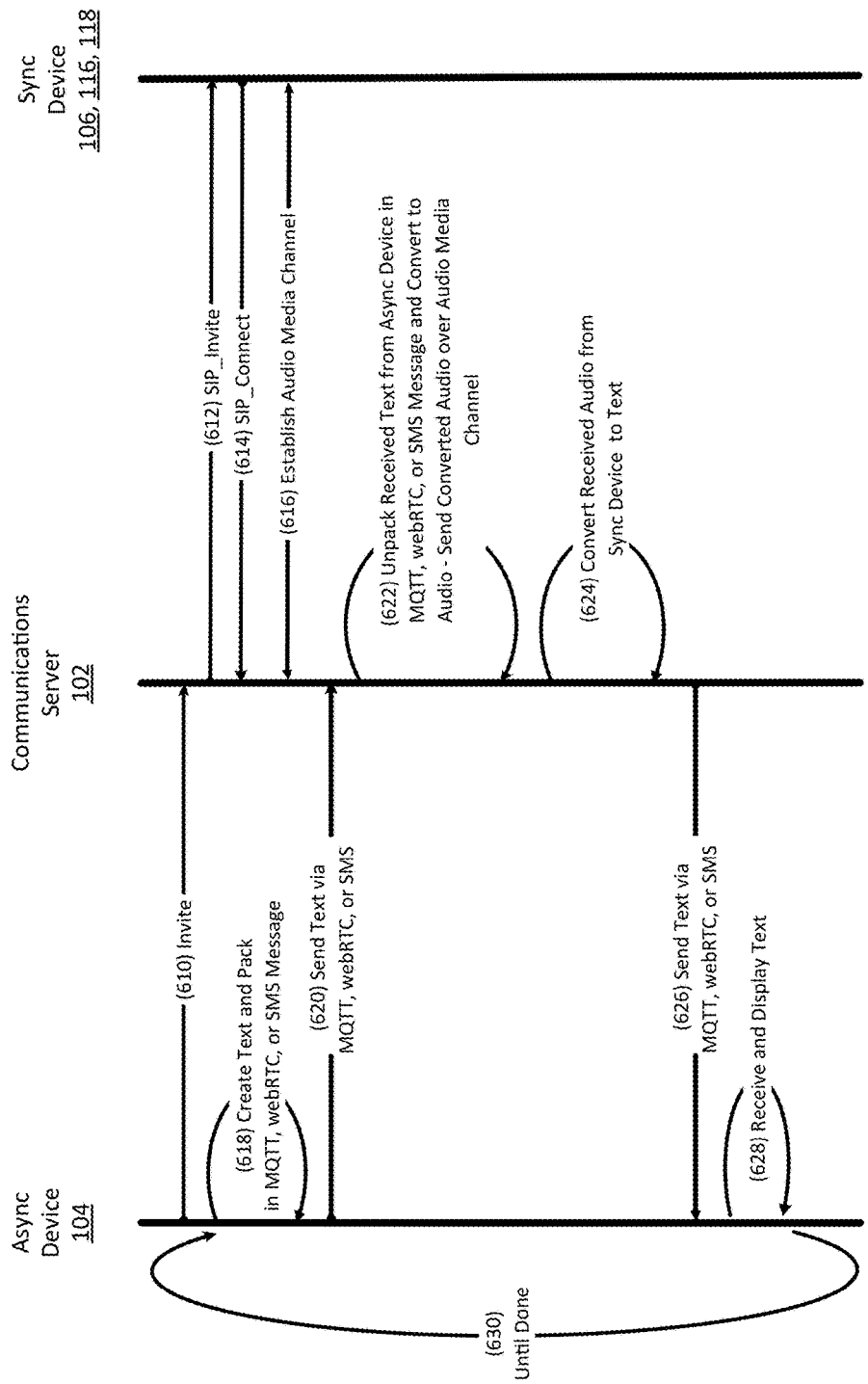

650

MEDIATION OF A COMBINED ASYNCHRONOUS AND SYNCHRONOUS COMMUNICATION SESSION

CROSS REFERENCE TO RELATED APPLICATIONS

This application is related to and claims priority benefit to U.S. Provisional Application 62/183,923 filed Jun. 24, 2015 entitled, "Mediation Of A Combined Asynchronous And Synchronous Voice Communication Session".

BACKGROUND

Communication devices utilizing wireless communication protocols are ubiquitous. These devices may utilize a cellular voice network (e.g., GSM or CDMA), a cellular packet data network (e.g., LTE) or a non-cellular packet data network such as 802.11 WiFi over the Internet to place and receive telephone calls to other communication devices. A communication device may include another mobile communication device on the same or another cellular network, a Voice-over Internet Protocol (VoIP) communication device, a hybrid VoIP/Cellular communication device and/or a plain old telephone service (POTS) communication device. Moreover, a variety of computer devices may utilize communication interfaces and protocols for exchanging audio, video, and text data over an Internet Protocol (IP) network such as, for instance, the Internet. Each of these telephony or computer communication devices may use a different access network but all are interfaced at some point to allow for communication among the different networks.

Communication may be further categorized as synchronous or asynchronous which, for purposes of this disclosure may refer to real-time versus near real-time and/or non real-time. For instance, synchronous communication can refer to an exchange between communication endpoints in which each endpoint may relay and render data in a real-time fashion. Asynchronous communication can refer to an exchange between communication endpoints in which each endpoint may relay and render data in a near real-time and/or non real-time fashion. Synchronous communication, due to its real-time nature, has a limited time domain in which to cope with various network factors including, for example, jitter compensation, out of sequence packet arrival, missing, late, or lost packets, etc. Additionally, synchronous communication generally may require constant and consistent attention and interaction from the parties at both communication endpoints in order to be productive, thereby maximizing each party's communication benefit and minimizing wasted time. Asynchronous communication is not bound by the same limited time domain as synchronous communication when coping with network factors, nor is it bound by the constant and consistent attention and interaction from the parties at both communication endpoints in order to be productive. Asynchronous communication may be capable of operating in circumstances where network conditions are unavailable, partially unavailable, congested, latent or otherwise non-conducive to synchronous communication through store and forward capabilities and alternate transport/protocol mechanisms preferring, for example, reliable delivery ordering and receipt acknowledgement of data.

Typically, synchronous and asynchronous devices do not communicate with one another in what one would characterize as a unified communication session. The real-time versus non or near real-time nature of the two modes does not necessarily make for a good communication experience mainly because of the delay associated with the asynchronous mode of communication. However, recent advances in networks and communication protocols have made it possible for asynchronous communications to be very close to real-time to the point of being usable with a synchronous device. This is especially true when such a device either is not capable of synchronous communication or does not currently have access to a network that supports, or can currently maintain, a synchronous communication. Moreover, there may be times when a device may have access to synchronous communications but wishes to remain in an asynchronous mode due to cost or environmental considerations. Environmental considerations may include a desire to remain in asynchronous mode because of high levels of background noise or an environment that is very distracting making it easier to maintain an asynchronous connection versus a synchronous connection.

Described herein are methods, systems, and techniques for mediating a communication session between an asynchronous communication device and a synchronous communication device.

BRIEF DESCRIPTION OF THE DRAWINGS

FIG. 4B is a second messaging diagram according to one or more embodiments described herein.

FIG. 5A is a third messaging diagram according to one or more embodiments described herein.

FIG. 6A is a fifth messaging diagram according to one or more embodiments described herein.

DETAILED DESCRIPTION

Figure 1:
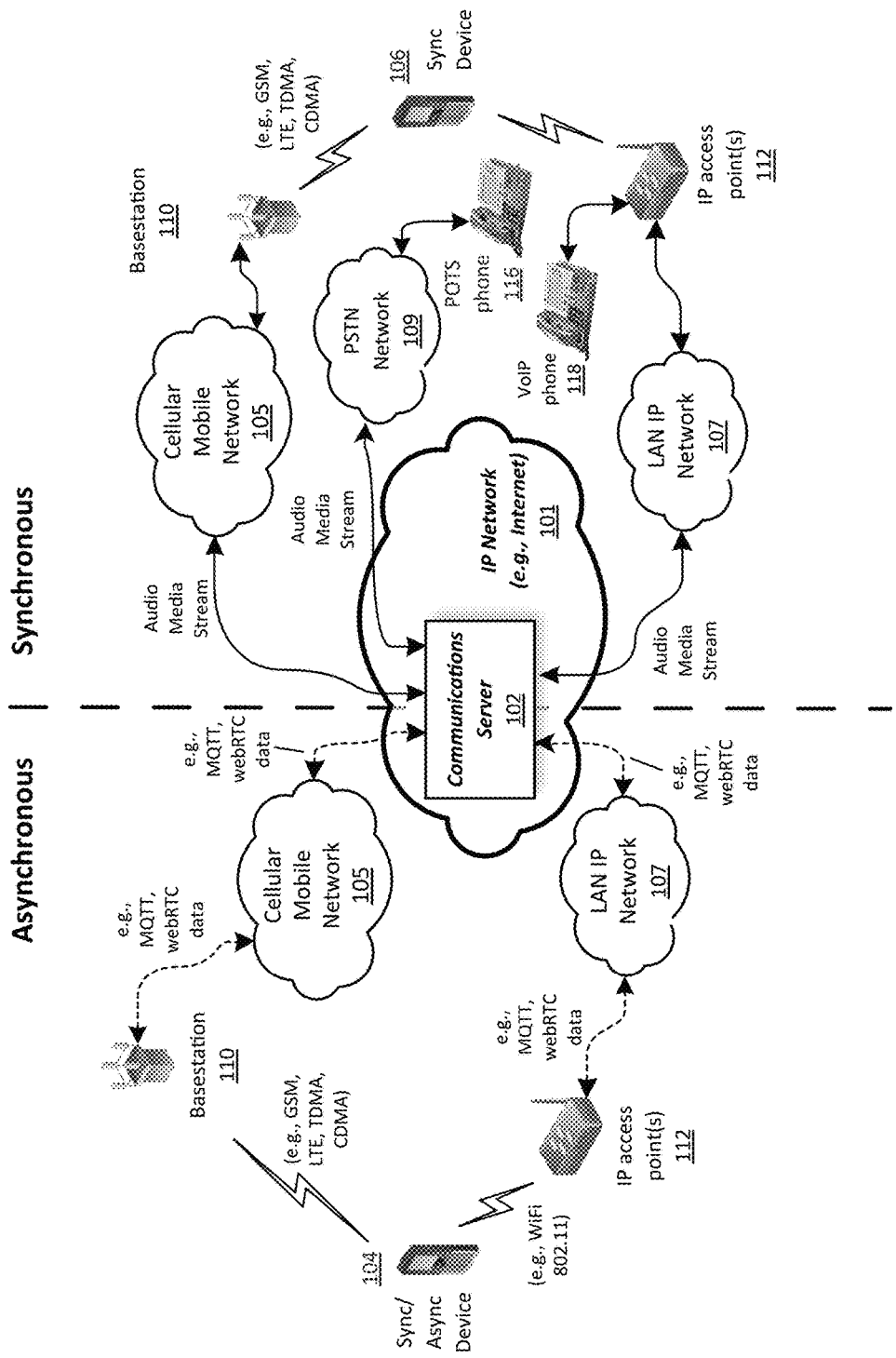
FIG. 1 illustrates an exemplary networked environment for implementing certain exemplary embodiments described herein.

The embodiments described herein disclose techniques, systems and methods for intelligently structuring, handling, and executing communication sessions among computer and/or communication devices. The systems and methods of the invention may be embodied in and performed by communication devices, communications servers, and other devices, as well as software instructions executed by some or all of such devices, as will be explained in detail below. The different types of networks contemplated herein include, for example, cellular mobile voice networks, cellular mobile data networks utilizing Internet Protocol (IP) protocol(s), the public switched telephone network (PSTN), and packet based data networks, such as the Internet or other packet switched IP-based networks, including wide area networks, local area networks, and combinations thereof.

As used herein the term "communication session" is meant to generally indicate a hybrid synchronous and asynchronous—duplex exchange of audio (e.g., voice telephony call, audio streaming data, or segmented audio data), between two or more computer and/or communication devices. As used herein, the term "communication device" is intended to mean a device capable of connecting to one or more telephony network(s) (e.g. the PSTN, one or more cellular mobile networks—voice and/or data, one or more VoIP networks, one or more data networks (e.g., the Internet, local area networks (LANs)). A device may be wired or wireless and may operate on one or more telephony networks including, but not limited to, a packet switched IP-based network, a cellular mobile network, a cellular data network or the PSTN. As used herein, the term "communication link" is intended to mean a physical or logical channel that connects a communication device with another communication endpoint. A communication endpoint may be another communication device or a communications server, the communications server operable to mediate a communication session between communication devices. A communication link may be a signaling link, a media link, or both. In this context, a communication session may be established via two communication links. One or more media streams may be transmitted over a communication link. A communications server may be situated between devices thereby making the communications server an endpoint in a communication link. A communications server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure's discussion of networks includes the portion of a network that connects devices to a service provider's core network. This portion of a network may also be referred to as the interface between the device and the network. Another type of interface may be the interface between networks. That is, the interface necessary to facilitate seamless communication from one network to another.

Therefore, references herein to a device capable of connecting to or communicating via a cellular mobile voice network or cellular mobile data network refer to a device equipped with a cellular transceiver for wireless communication with basestations and other cellular mobile access points. Similarly, references herein to a device capable of connecting to or communicating via a data network refer to a device equipped with a transceiver or other network interface for wireless communication (e.g., 802.11) with a router or other data network access point. One particular device may be characterized herein as a communication device. A communication device may include multiple RF transceivers, one of which may be operable to connect to an access network for a cellular mobile network and another of which may be operable to connect to an access network for an IP data network (e.g., 802.11).

FIG. 1 illustrates an exemplary networked environment 100 for implementing certain exemplary embodiments described herein. The networked environment 100 may include multiple distinct inter-connected networks such as, for instance, a large scale Internet Protocol (IP) network (e.g., the Internet) 101, one or more IP based local area networks (LAN) 107, cellular mobile networks 105, and the PSTN 109. While these distinct networks utilize different protocols and signaling schemes, there are various interfaces (not shown) that allow for the seamless transition of voice and data (including text, audio, and video) such that various devices may communicate with one another over one or more of these inter-connected networks.

The PSTN 109 can be characterized as a circuit switched point-to-point communication network in which a physical connection between the endpoints is maintained for the duration of the connection or communication link. The PSTN 109 may also be referred to as the legacy telephone network as it is the backbone infrastructure for connecting communication devices comprised of Plain Old Telephone Service (POTS) phones 116.

Cellular mobile networks 105 may come in different varieties based on the radio transmission scheme between a communication device 104, 106 (e.g., mobile or cellular phone) and the cellular mobile network basestation 110 that may be in communication with the communication device 104, 106. In this embodiment, communication device 104 represents a communication device capable of asynchronous communication with a communications server 102 while communication device 106 may be limited to synchronous communications with communications server 102. Two such circuit switched voice radio transmission schemes are the Global System for Mobile Communication (GSM) and Code Division Multiple Access (CDMA). These circuit switched radio transmission schemes are incompatible with one another necessitating an intervening interface to allow communication between endpoints on either network. In addition, each network may operate over specific frequency ranges. Often, there may even be an intervening network such as the PSTN 109 between two distinct cellular mobile voice networks 105. For each cellular mobile voice network 105, an interface to the PSTN 109 may exist such that calls crossing that interface can be handled by the receiving network whether it is a cellular mobile network 105 or the PSTN 109.

Various cellular mobile network operators base their voice communications on one of the circuit switched radio transmission schemes and provide service to communication devices 104, 106 using that radio transmission scheme over a defined frequency band. For example, a communication device 104, 106 wirelessly communicates with a basestation 110 that serves as an access network to the cellular mobile network 105. The basestation 110 authenticates and authorizes the communication device 104, 106 to the cellular mobile network 105 and, in conjunction with other equipment within the cellular mobile network 105, manages calls to and from the communication device 104, 106. The cellular mobile network 105 may provide circuit switched connectivity for any communication devices 104, 106 capable of cellular transmission that are physically located within range of the cellular mobile network 105. The range of a cellular mobile network 105 depends in part on an amplification, power, and/or energy associated with the antennas comprising cellular base station, communication devices 104, 106 and the like. This is true whether the communication device is utilizing the cellular mobile network's circuit switched voice protocols or data protocols (e.g., 2G, 3G, 4G, LTE, etc. . . . ) to communicate.

In fact, synchronous and asynchronous communications between a communication device 104 and communications server 102 may occur over a cellular IP data channel such as, for instance, a 2G IP data channel, a 3G IP data channel, a 4G IP data channel, or LTE. Using these aforementioned data channels as the conduit for IP packet data, the communication device 104 may utilize any number of protocols (e.g., VoIP, MQTT, webRTC) or messaging schemes (e.g., short messaging service (SMS) or multi-media messaging service (MMS)) to exchange content with the communications server 102.

Similarly, an IP based data network 107 like the Internet 101 may provide wireless connectivity to communication devices 104, 106 that are also VoIP enabled and VoIP communication devices 118 within range of an IP access point 112. For instance, an IP access point 112 may provide wireless connectivity using any of the 802.11 WiFi standards and/or any other type of IP based connectivity standard. As will be appreciated by those of skill in the art, a communication device 104, 106 or VoIP communication device 118 may experience a stronger connection signal when located closer to an IP access point 112 than when located further away from the IP access point 112. Thus, the strength of the wireless data connection may fade as the dual mode communication device 104, synchronous mode communication device 106, or VoIP communication device 118 moves away from an IP access point 112. In some cases the VoIP communication device 118 may be wired directly to the IP access point 112 via, for instance, an Ethernet coupling. In another embodiment, a computer device (not shown) may be used to create and exchange messages with communications server 102.

The collection of IP based data networks illustrated in FIG. 1 such as LANs 107, and the Internet 101 all run on a packet based data transfer protocol characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. VoIP communication device 118 and VoIP enabled communication devices 104, 106 utilize an IP access point 112 to the larger IP network such as LAN 107 and then Internet 101. The IP access point 112 may be wired, wireless (e.g., WiFi), or a combination wired/wireless access point such as those illustrated in FIG. 1. A VoIP communication device 118 and VoIP enabled communication devices 104, 106 may communicate with an IP access point 112 to gain access to the larger IP network 101 and other communication devices. The VoIP communication device 118 has been illustrated as a wireline type device but may just as easily be a wireless device communicable with the IP access point 112 over, for instance, one or more of the 802.11 protocols, like the VoIP enabled communication devices 104, 106. The communications server 102 may act as a centralized point for mediating communication sessions between devices. The communications server 102 may send and receive signaling data to set up and establish communication links between itself and the communication devices 104, 106, 116, 118. Once these communication links are established, the communications server 102 may mediate synchronous, asynchronous, or a hybrid sync/async communication session.

In certain embodiments, cellular mobile network(s) 105 include cellular networks or portions of cellular networks based on GSM, CDMA, 2G, 3G, 4G, LTE, and/or any other cellular network standards. IP based data networks 107, 101 include, for example, the Internet, one or more intranets, wide area networks (WANs), local area networks (LANs), and the like, portions or all of which may be wireless and/or wired. For instance, an IP based data network 107, 101 may be a wireless network or a portion of a wireless network implemented using an IEEE 802.11 standard, WiMAX (e.g., IEEE 802.16), and/or any other wireless data communication standard.

The various networks 109 (PSTN), 105 (Cellular), 107, 101 (IP Based) may interface with communications server 102 through gateway devices, routers and/or other appropriate devices (not shown). Similarly, the communication devices 104, 106 may interface with the various networks 109 (PSTN), 105 (Cellular), and 107, 101 (IP based) through appropriate access points 110, 112 (others not shown).

In addition, the communication devices 104, 106 via the cellular mobile network 105 or a LAN IP network 107 are capable of sending data including short message service (SMS, MMS) text or media messages into the IP network(s) 101, 107. Further, the communication devices 104, 106 via the cellular mobile network 105 or a LAN IP network 107 are capable of sending data over out of band signaling and data mechanisms/protocols such as Message Queuing Telemetry Transport (MQTT) and webRTC data channels.

Figure 2:
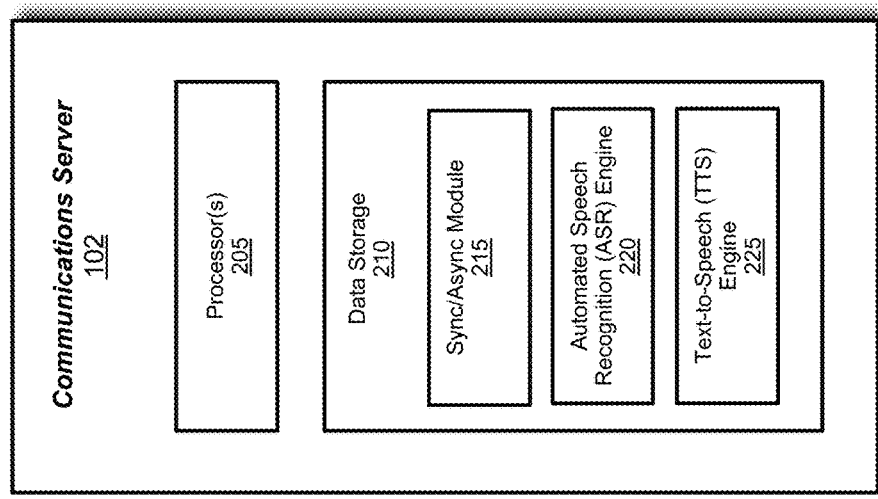
FIG. 2 is a block diagram illustrating some of the functions of a communications server according to one or more embodiments described herein.

FIG. 2 is a block diagram illustrating some of the functions of the communications server 102 according to one or more embodiments described herein. The communications server 102 may comprise, for example, a server computer or any other system having computing capability and IP network connectivity. The communications server 102 may be hosted in a packet based IP network such as, for instance, the Internet. The schematic block diagram shows that the communications server 102 may include at least one processor 205, a data storage component 210 storing a Sync/Async module 215 possessing one or more communication interfaces. The data storage module may further include an Automated Speech Recognition (ASR) engine 220 and a Text-to-Speech (TTS) engine 225.

The Sync/Async module 215 may be responsible for constructing, accepting, maintaining, and mediating the various communication links of a communication session. Each participating device in a communication session may be communicable with the communications server 102 via the Sync/Async module 215 over a separate communication link or links. The Sync/Async module 215 may also mediate between the appropriate communication links to create a communication session between two communication devices in which one communication device is in a synchronous communication mode while the other communication device is in an asynchronous communication mode.

The Sync/Async module 215 may be responsible for processing communication session signaling and media including setting up and tearing down communication links with various devices and other call servers using one or more communication channels or protocols. In one embodiment, the Sync/Async module 215 may send and receive session initiation protocol (SIP) messages. While the Sync/Async module 215 may utilize one or more VoIP protocols such as SIP, it can communicate synchronously with end user devices that are not VoIP based by routing VoIP signaling, such as SIP, through other call servers that perform interface conversions from SIP to other protocols such as, for instance, SS7 for the PSTN or CDMA/TDMA/GSM for cellular mobile networks.

The data storage component 210 of communications server 102 may also include an ASR engine 220 and a TTS engine 225. The ASR engine 220 and the TTS engine 225 provide an additional capability to mix voice and text communications within a single communication session. For instance the asynchronous user may be in a meeting that prevents them from speaking but not from creating text messages. In this scenario, the communications server 102 via the ASR engine 220 and a TTS engine 225 can convert text to speech and send the audio to the synchronous user while converting speech to text to send to the asynchronous user.

Alternatively, a plurality of communications servers 102 may be employed and may be arranged, for example, in one or more server banks or computer banks or other arrangements. For example, a plurality of communications servers 102 together may comprise a cloud computing resource, a grid computing resource, and/or any other aggregated or distributed computing arrangement. Such communications servers 102 may be located in a single installation or may be distributed among different geographical locations. For purposes of convenience, the communications server 102 is illustrated in FIGS. 1 and 2 and referred to herein in the singular. Even though the communications server 102 is referred to in the singular, it is understood that a plurality of communications servers 102 may be employed in various arrangements as described above. In addition, the communications server 102 functions may themselves be separated into different servers. For example, there may be one or more communications servers 102 hosting and executing Sync/Async modules 215. Such an architecture may be representative of a larger media server handling the media streams while other communication servers 102 handle communication session signaling and coordinate the use of a media server for media.

The communication interface(s) may include a voice-over-IP (VoIP) interface adapted to exchange IP based telephony signaling and/or media data with other IP network devices using a VoIP protocol. Another communication interface may be a PSTN interface adapted to convert incoming PSTN signaling and audio data to VoIP signaling and audio data and convert outgoing VoIP signaling and audio data to PSTN signaling and audio data. Still another communication interface may be an IP data interface adapted to exchange IP data with other IP network devices. The IP data may be indicative of audio, video, text or other streaming data. This may also include IP data exchanged with a mobile communication device over an intermediate cellular mobile network. Yet another communication network interface may be directed toward an alternative network (not shown) adapted to exchange data with a computing and/or communications device. Examples of alternative network(s) may include, but are not limited to, WiMax and whitespace. A whitespace network may be characterized as one that utilizes frequency spectrum that is overlapping with that of broadcast television frequency spectrum.

Figure 3:
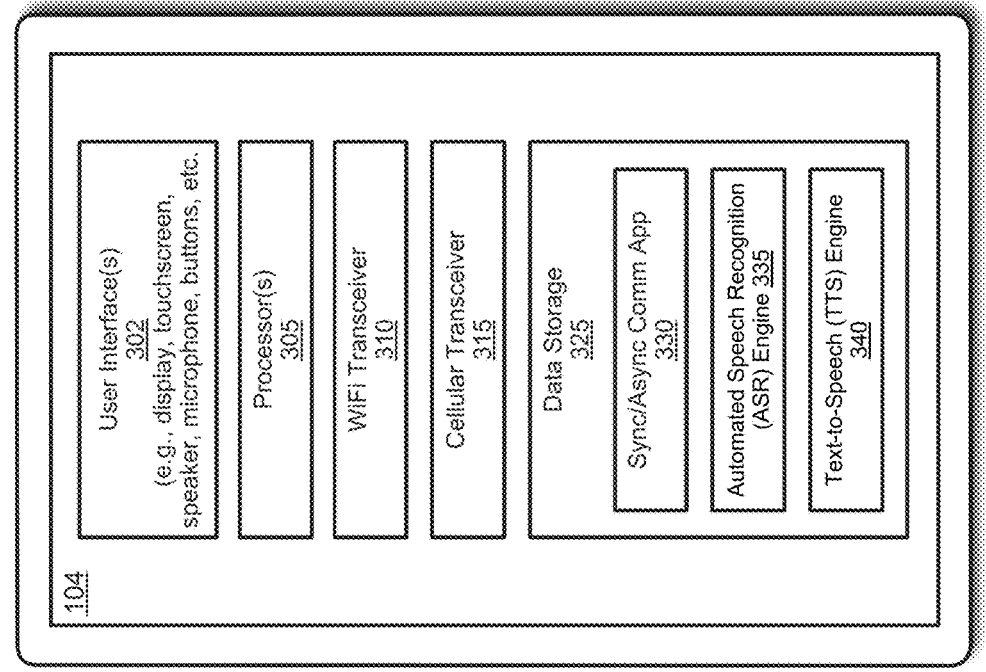
FIG. 3 is a block diagram illustrating a multi-mode communication device according to one or more embodiments described herein.

FIG. 3 is a block diagram illustrating a communication device 104 capable of both synchronous and asynchronous communication with the communications server 102 according to one or more embodiments described herein. The communication device 104 may include a processor or processors 305 for controlling the various components and functions of the communication device 104. The communication device 104 may also include multiple RF transceivers such as, for instance, a WiFi transceiver 310 and a cellular transceiver 315.

The WiFi transceiver 310 may be operable to communicate with an IP network access point 112 using one or more of the 802.11 wireless transmission protocols. Upon connection with an IP network access point 112, the communication device 104 may exchange IP data with servers or other computers that are connected with or communicable with the Internet 101 via LAN/WAN 107. Such IP data exchanges may also occur using, for instance, an MQTT channel to carry IP data or an MMS transport mechanism to carry audio data. This may include the communications server 102 shown in FIG. 1.

The cellular transceiver 315 may be operable to communicate with a cellular mobile network 105 for both circuit switched voice and IP data communication. On the circuit switched voice side, the cellular mobile network 105 may be based on GSM, CDMA, TDMA or other communication protocols while on the cellular IP data side, the cellular mobile network 105 may be based on, for example, GPRS, EDGE, EV-DO, HSPA-D, HSPA-U, LTE, UMTS-WCDMA, UMTS-TDD, etc. It should be noted that the cellular IP data may include media (e.g., voice) data thereby making the cellular IP data side a viable conduit for synchronous voice communications based on VoIP or asynchronous voice communications using, for instance an MQTT channel, webRTC data channel, or even a multi-media messaging system (MMS) message.

The communication device 104 may further include data storage 325 and software applications such as, for instance, a sync/async communications application 330. The communication device 104 may also include various user interface(s) 302. The data storage 325 may include, for example, one or more types of memory devices including, but not limited to, flash memory usable for ROM, RAM, PROM, EEPROM, and cache. Other software applications (not shown) may include, for example, one or more software applications executable on or by the processor(s) 305 including, but not limited to, email applications, native phone dialers, contact applications, calendar applications, and specific data and/or audio/video applications. The user interface(s) 302 may include, for example, a display, a touchscreen for soft-key input, speaker(s), microphone(s), a keyboard for hard-key input, and one or more buttons. The data storage 325 may store contact data for people including, but not limited to, multiple telephone numbers, email addresses, SMS/MMS enabled telephone numbers, postal addresses, and the like. The contact data may be used by a contact application in conjunction with other applications on the communication device 104 to facilitate communication sessions with the people in the contact database.

Similar to communications server 102, a data storage component 325 of communication device 104 may also include an ASR engine 335 and a TTS engine 340. The ASR engine 335 and the TTS engine 340 provide an additional capability to mix voice and text communications within a single communication session.

In one embodiment, the sync/async communications application 330 may facilitate setting up, via the user interface(s) 302, a hybrid sync/async communication session with another end user device mediated by the communications server 102. In this embodiment, the end user may issue a speech command that gets parsed and packed into an MQTT channel (or webRTC data channel) and sent over an IP data channel (e.g., 802.1 WiFi or one of the cellular IP data protocols) to the communications server 102. The communications server 102 may then process the speech command and convert it to telephony signaling instructions. For instance, the speech command may include the audio "Call Jared". The communications server 102 may have knowledge of the end user's contacts such that it can determine who Jared is and a telephone number associated with Jared. Similarly, the speech command may include audio such as "Call 919-555-1234". In this example, the communications server 102 will interpret the speech command as a request to establish a connection with the device associated with the telephone number 919-555-1234. The communications server 102 may then set about to establishing a synchronous communication link, via SIP for instance, with the telephone number associated with Jared in the first example or the telephone number 919-555-1234 in the second example. Once this communication link with the destination end user device is established, that device may communicate synchronously with the communications server 102. The communications server 102 also maintains an asynchronous connection with the end user calling device over, for instance, an MQTT channel (or webRTC data channel) riding on an 802.11 WiFi connection or one of the cellular IP data connections. At this point, the communications server 102 may receive voice data synchronously from one end user device and parse and pack it into a series of MQTT messages for delivery to the other end user device. In the reverse direction, the communications server 102 may receive voice data asynchronously via a series of MQTT messages from the device operating in asynchronous mode. This voice data in the MQTT messages is then re-packaged and relayed by the communications server 102 over the synchronous communication link to the other end user device. Thus, the communications server 102 sits between the two end user devices and converts, as necessary, sync to async and vice versa to enable a hybrid communications session between two end user devices not necessarily operating in the same mode—sync or async.

In another embodiment, the communications server 102 and/or the communication device 104 may employ an ASR engine 220, 335 and TTS engine 225, 340 to convert speech to text and text to speech. Utilization of such engines may allow the communications server 102 and/or communication device 104 to translate voice requests, audibly output dynamic data, and overall mix/blend a communication session in which one end user device is communicating synchronously via voice while the other end user device is communicating asynchronously via text. In such a scenario, the communications server 102 and/or communication device 104 may, via ASR engines 220, 335 recognize and convert voice media into text. Similarly, communications server 102 and/or communication device 104 may, via TTS engines 225, 340, convert text to speech in order to convey typed messages from an asynchronous device to a simulated voice for a synchronous device. The embodiments are not necessarily limited to the examples described herein.

FIG. 3 has been described as a communication device 104. Other types of telephony and/or computing devices may be used in addition to the just described communication device 104. For example, a networked computer having Internet connectivity may also include many of the same applications (e.g., text messaging, browser, email) that perform many of the same functions as communication device 104. If the networked computer further includes a cellular transceiver, it can perform all of the functions that are associated with the communication device 104. Similarly a VoIP terminal with a processor and programmable storage that is connected to an IP network may also include many of the same applications (e.g., text messaging, browser, email) that perform many of the same functions as communication device 104. Another example may be a tablet computer device with WiFi and/or cellular IP data capabilities that is connectable to an IP network. Thus, a communication device 104 is only one type of device that can initiate a communication session using the techniques described herein.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4A:
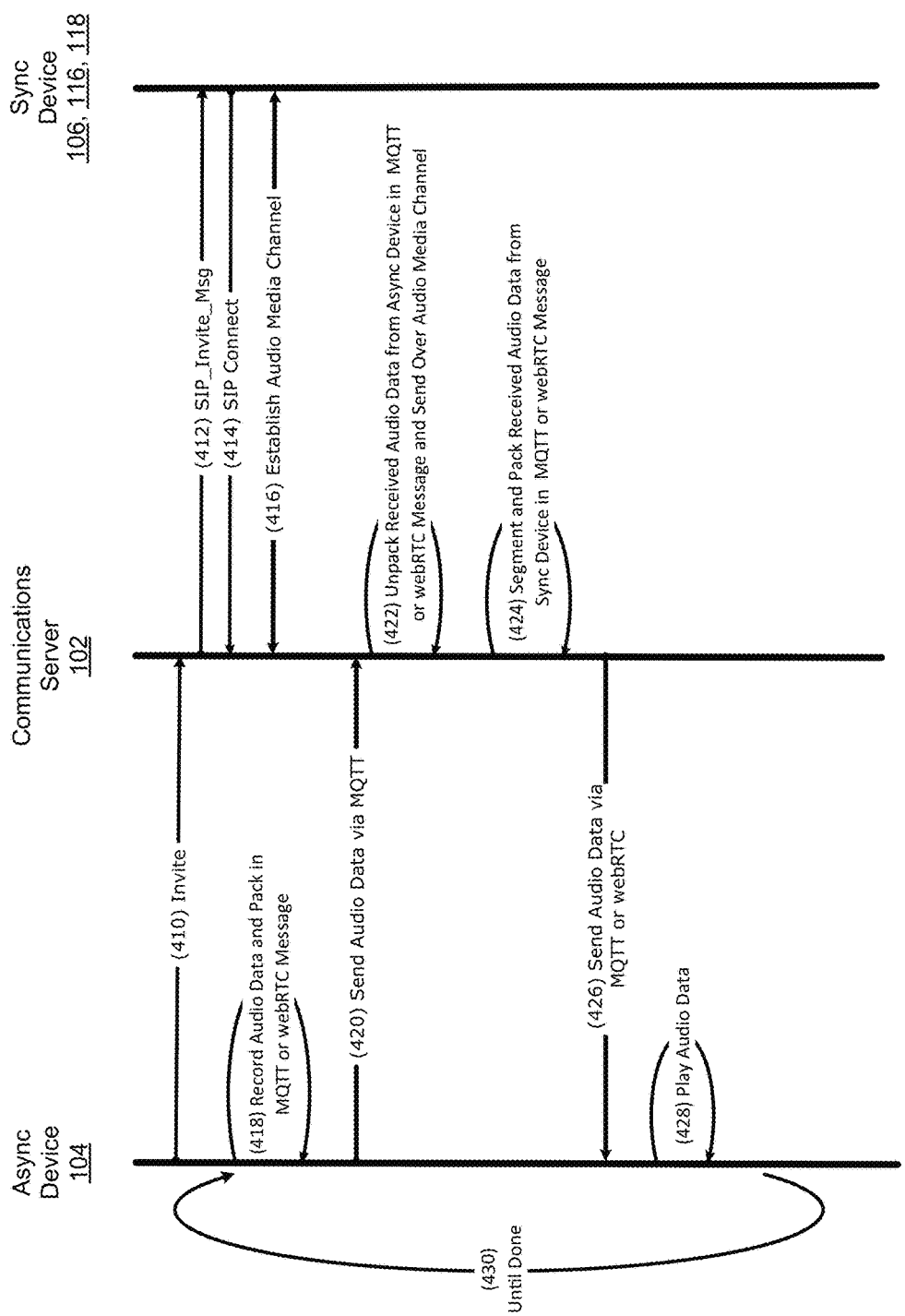
FIG. 4A is a first messaging diagram according to one or more embodiments described herein.

FIG. 4A is one embodiment of a messaging diagram for establishing a communication session between an asynchronous capable initiating communication device 104 to a synchronous communication device 106, 116, 118. In this embodiment, an initiating communication device 104 creates and sends an invite message 410 to a communications server 102. The invite message 410 may include contact information for the destination communication device such as a telephone number or an audio contact request, as well as various communications paths for communication links, sync/async communication modality capabilities and modalities supported and/or requested. The invite message 410 may include identifying and/or authenticating information for the initiating communication device 104, or it may have been previously established over, for example, an existing signaling link. The invite message 410 may be sent using a lightweight protocol such as, for instance, MQTT or webRTC data channel over an 802.11 WiFi access point if available or over a cellular based IP data channel. The invite message 410 may also be packed into an SMS/MMS message in which the communications server 102 is associated with an SMS/MMS enabled telephone number. The invite message 410 may also be implicit from an SMS text message or MMS audio message addressed to the destination communication device 106, 116, 118 and relayed through the communication server 102, whereby the destination communication device 116 does not have the capabilities to receive those types of messages, as it is a POTS phone. Likewise, in another embodiment, preferences may have been previously established to relay and transform SMS text message(s) or MMS media message(s) in such manner. A 'dialer' or 'messaging' application executing on the initiating communication device 104 may determine which mechanism to send the invite message 410.

The communications server 102 unpacks and parses the invite message 410 to determine the identity of both the initiating communication device 104 and destination communication device 106, 116, 118. In an embodiment in which the identity information is a telephone number—or resolves to a telephone number, the communications server 102 sets out to establish a synchronous communication link with the destination communication device 106, 116, 118. The communications server 102 may issue a SIP Invite 412 addressed to the destination communication device 106, 116, 118. While not generally pictured, the SIP invite 412 may include information necessary to identify the initiating communication device 104. The destination communication device 106, 116, 118 may respond with a sequence of messages intended to accept the SIP invite 412. This sequence of messages may be shorthanded here as a SIP connect 414. At this point, the communications server may respond appropriately and a synchronous audio media channel 416 may be established between the communications server 102 and the destination communication device 106, 116, 118.

As the communications server 102 is establishing a synchronous communication link with the destination communication device 106, 116, 118, the initiating communication device 104 may begin creating and sending audio data to the communications server 102 to be relayed to the destination communication device 106, 116, 118. An end user may utilize an interface on the initiating communication device 104 to record audio that may then be segmented and packed as IP data into a series of MQTT or webRTC messages 418, for instance. Once the audio data has been packed into the transport mechanism, MQTT, webRTC, or otherwise, the audio data may be sent message by message 420 to the communications server 102. The communications server 102 unpacks, reformats and sends 422 the audio data received from the initiating communication device 104 to the destination communication device 106, 116, 118 over the established audio media channel 416.

The end user of the destination communication device 106, 116, 118 may consume the audio data and respond by talking back. The speech or audio data is again carried over the audio media channel 416 from the destination communication device 106, 116, 118 to the communications server 102. This time the communications server 102 segments and packs the received audio into one or more MQTT or webRTC messages 424 or other transport mechanism. The communications server 102 may then send 426 the MQTT or webRTC messages to the initiating communication device 104. The end user of the initiating communication device 104 may, automatically or via a user interface, play the received audio data 428. Upon listening, the end user of the initiating communication device 104 may opt to continue the conversation by recording additional audio data 418. The ASR engine 335 may recognize a key word such as the destination user's name and automatically record anything that follows terminating the recording upon end of speech detection. The user interface may also utilize DTMF tones to mark the beginning and end of speech segments. This process 430 may continue until the conversation is complete. The conversation may continue in this manner whereby the initiating communication device 104 is communicating asynchronously with the communications server 102 while the destination communication device 106, 116, 118 is communicating synchronously with the communications server 102. The communications server 102 mediates between the two devices to keep the communication session going.

In some embodiments, the invite message 410 may contain both the destination information as well as initial audio data for relay as would otherwise be provided in 418. For example, and invite message 410 may contain an audio data request of "Message Jared. Want to meet for dinner tonight?" Wherein an implicit audio relay 422 of "Want to meet for dinner tonight?" happens immediately after 416 without 418 or 420.

It should be noted that if the destination communication device 106 routes the original invite request to a voice mail system, the originally recorded audio data 418 may be recorded into the destination communication device's 106, 116, 118 voice mail system. In another embodiment, if the communication server 102 determines that the request has been routed into a voice mail system and the destination communication device supports SMS text messages and/or MMS audio messages the message could be alternately or additionally delivered via SMS text message after ASR processing or sent via an MMS audio message. This preference may be inferred by the communication server 102 as desirable if, for example, the destination communication device 106, 116, 118 responds to the call with a quick response text message. It should further be noted that that content of the text message response may be helpful and used by the communication server 102 in the determination of the message relay mode preference.

FIG. 4B is another embodiment of a messaging diagram for establishing a communication session between an asynchronous capable communication device 104 to a synchronous communication device 106, 116, 118. In this embodiment, the synchronous initiating communication device 106, 116, 118 and the asynchronous destination communication device 104 are reversed from FIG. 4A. The initiating communication device 106, 116, 118 may send a SIP invite to the communications server 102 intending to establish a communication session with the destination communication device 104. The intent of the initiating communication device 106, 116, 118 may be to establish a synchronous communications session but the communications server 102 may determine that the destination communication device 104 is currently in an asynchronous mode. In such a case, the communications server 102 may establish a synchronous communication link with the synchronous initiating communication device 106, 116, 118 as described above. Similarly, the communications server 102 may segment and pack the received audio into one or more MQTT or webRTC messages 424 or other transport mechanism. The communications server 102 may then send 426 the MQTT or webRTC messages to the destination communication device 104. The end user of the destination communication device 104 may, via a user interface, play the received audio data 428. The end user of the destination communication device 104 may opt to continue the conversation by recording and packing audio data into one or more MQTT messages, webRTC messages or the like 418. The segmented audio data may then be sent via MQTT, webRTC or the like from the destination communication device 104 to the communications server 102. Just as before, the conversation may continue in this manner whereby the initiating communication device 106, 116, 118 is communicating synchronously with the communications server 102 while the destination communication device 104 is communicating asynchronously with the communications server 102. The communications server 102 mediates between the two devices to keep the communication session going.

Figure 5B:
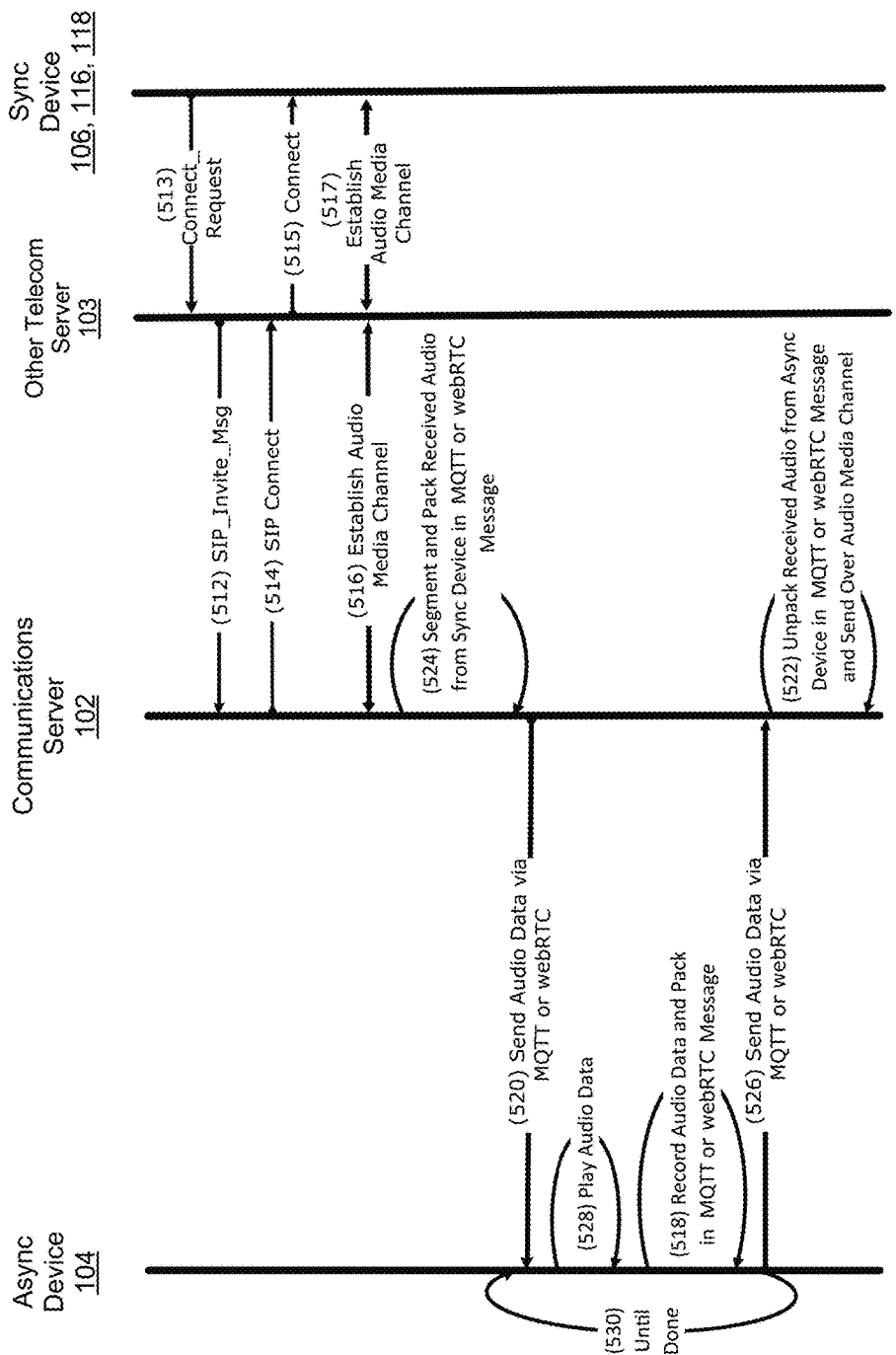
FIG. 5B is a fourth messaging diagram according to one or more embodiments described herein.

FIGS. 5A and 5B are additional embodiments of a messaging diagram for establishing a communication session between an asynchronous capable communication device 104 to a synchronous communication device 106, 116, 118. Not all synchronous communication devices 106, 116, 118 are or need be SIP devices. In this embodiment, there maybe an other telecom server 103 between communications server 102 and the synchronous communication device 106, 116, 118. In such a situation, the other telecom server 103 may be responsible for bridging communications between the synchronous communication device 106, 116, 118 and the communications server 102. For example, if a SIP_Invite message 512 encounters an intermediate interface server (e.g., other telecom server 103) before reaching the synchronous communication device 106, 116, 118 to which the SIP_Invite message is intended, the other telecom server 103 will translate the SIP_Invite message 512 to a Connect_Request message 513 and forward to the intended synchronous communication device 106, 116, 118. The Connect_Request label is generic and is not intended to represent any specific protocol or telecommunication signaling system. Rather, it is representative of whatever signaling or messaging is implemented by the other telecom server 103 in communicating with synchronous communication device 106, 116, 118. Thus, the Connect_Request message 513 may be an SS7 protocol message, a CDMA protocol message, a TDMA protocol message, etc. depending on the telecommunication protocol implemented by the other telecom server 103.

The synchronous communication device 106, 116, 118 may receive a Connect_Request message 513 and respond accordingly. The synchronous communication device 106,

116, 118 may return a Connect message 515 to the other telecom server 103 which, in turn, translates the generic Connect message 515 to a SIP Connect message 514 and forwards the SIP Connect message 514 to the communications server 102. The communications server 102 may then establish an audio media channel 516, 517 between the communications server 102 and the synchronous communication device 106, 116, 118. The audio media channel 516, 517 may traverse one or more telephony networks and one or more other telecom servers 103 depending on the telephony network to which a synchronous communication device 106, 116, 118 subscribes.

The remainder of FIG. 5A operates the same as that illustrated and described in FIG. 4A. Similarly, the remainder of FIG. 5B operates the same as that illustrated and described in FIG. 4B. In each case the difference lies in how the synchronous communication device 106, 107, 109 ultimately connects with the communications server 102. In FIGS. 4A-B, the synchronous communication device 106, 107, 109 may utilize the SIP protocol whereas in FIGS. 5A-5B, the synchronous communication device 106, 107, 109 may not utilize the SIP protocol and require the other telecom server 103 to translate to/from the SIP protocol.

FIG. 6A illustrates another embodiment of a messaging diagram for establishing a communication session between an asynchronous capable initiating communication device 104 to a synchronous communication device 106, 116, 118. In this embodiment, the communication between the communications server 102 and the asynchronous device 104 may be text based not voice or audio based.

In this embodiment, an initiating communication device 104 creates and sends an invite message 610 to a communications server 102. The invite message 610 may include contact information for the destination communication device such as a telephone number or an audio contact request, as well as various communications paths for communication links, sync/async communication modality capabilities and modalities supported and/or requested. The invite message 610 may include identifying and/or authenticating information for the initiating communication device 104, or it may have been previously established over, for example, an existing signaling link. The invite message 610 may be sent using a lightweight protocol such as, for instance, MQTT or webRTC over an 802.11 WiFi access point if available or over a cellular based IP data channel. The invite message 610 may also be packed into an SMS text message in which the communications server 102 is associated with an SMS enabled telephone number. The invite message 610 may also be implicit from an SMS text message or MMS audio message which is addressed to the destination communication device 106, 107, 109 and is relayed through the communication server 102, whereby the destination communication device 109 does not have the capabilities to receive those types of messages, as it is a POTS phone. Likewise, in another embodiment, preferences may have been previously established to relay and transform SMS text message(s) or MMS audio message(s) in such manner. A 'dialer' or 'messaging' application executing on the initiating communication device 104 may determine which mechanism to send the invite message 610.

The communications server 102 unpacks and parses the invite message 610 to determine the identity of both the initiating communication device 104 and destination communication device 106, 116, 118. In an embodiment in which the identity information is a telephone number or resolves to a telephone number, the communications server 102 sets out to establish a synchronous communication link with the destination communication device 106. The communications server 102 may issue a SIP_Invite 612 addressed to the destination communication device 106. While not generally pictured, the SIP invite 612 may include information necessary to identify the initiating communication device 104. The destination communication device 106 may respond with a sequence of messages intended to accept the SIP invite 612. This sequence of messages may be shorthanded here as a SIP connect 614. At this point, the communications server may respond appropriately and a synchronous audio media channel 616 may be established between the communications server 102 and the destination communication device 106. It should be noted that the destination communication device 106 may be associated with a non-SIP system in which case the teachings and description of FIGS. 5A-5B regarding an other telecom server 103 come into play to allow for a media channel to be set up and maintained between the communications server 102 and the destination communication device 106.

As the communications server 102 is establishing a synchronous communication link with the destination communication device 106, 116, 118, the initiating communication device 104 may begin creating and sending text data to the communications server 102. An end user may utilize an interface on the initiating communication device 104 to enter text that may then be segmented and packed as IP data into a series of MQTT messages, or webRTC messages 618, for instance. Once the text data has been packed into the transport mechanism, MQTT, webRTC, or otherwise, the text data may be sent 620 message by message to the communications server 102. The communications server 102 unpacks the text messages and converts the text to speech via a TTS engine 225. The speech may then be sent 622 to the destination communication device 106 over the established audio media channel 616.

The end user of the destination communication device 106 may consume the audio data and respond by talking back. The speech or audio data is again carried over the audio media channel 616 from the destination communication device 106 to the communications server 102. This time the communications server 102 converts the speech to text via an ASR engine 220 before segmenting and packing the converted audio into one or more MQTT or webRTC messages 624 or other transport mechanism. The communications server 102 may then send 626 the MQTT or webRTC messages to the initiating communication device 104. The end user of the initiating communication device 104 may, via a user interface, read the received text 628. Upon reading, the end user of the initiating communication device 104 may opt to continue the conversation by creating another text 618. This process 630 may continue until the conversation is complete. The conversation may continue in this manner whereby the initiating communication device 104 is communicating asynchronously by text with the communications server 102 while the destination communication device 106 is communicating synchronously by voice with the communications server 102. The communications server 102 mediates between the two devices converting from speech to text and text to speech when appropriate to keep the communication session going.

Figure 6B:
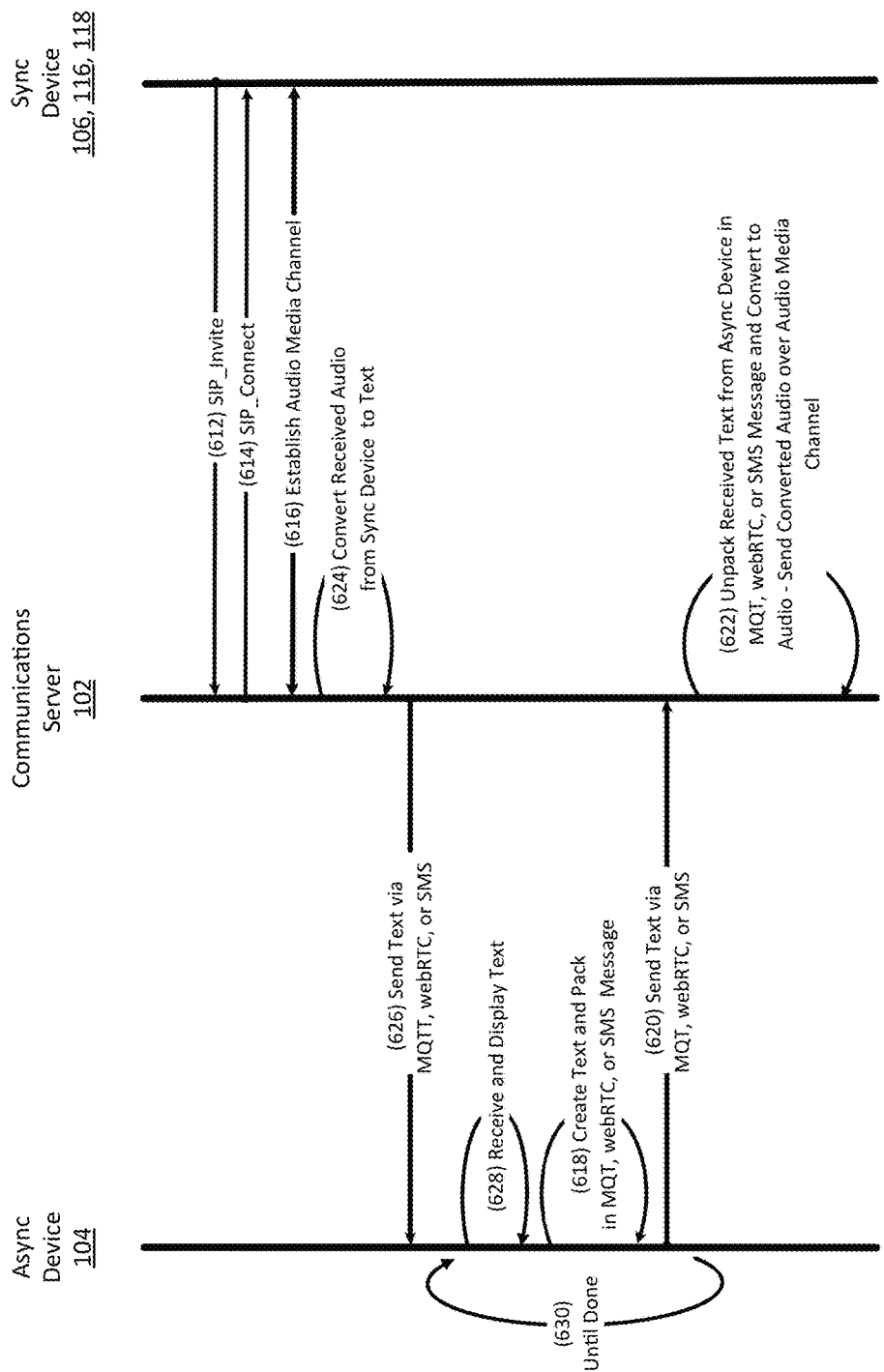
FIG. 6B is a sixth messaging diagram according to one or more embodiments described herein.

FIG. 6B is another embodiment of a messaging diagram for establishing a communication session between an asynchronous capable communication device 104 to a synchronous communication device 106, 116, 118. In this embodiment, the synchronous initiating communication device 106, 116, 118 and the asynchronous destination communication device 104 are reversed from FIG. 6A. The initiating communication device 106, 116, 118 may send a SIP invite 612 to the communications server 102 intending to establish a communication session with the destination communication device 104. The intent of the initiating communication device 106 may be to establish a synchronous communications session but the communications server 102 may determine that the destination communication device 104 is currently in an asynchronous mode. In such a case, the communications server 102 may establish a synchronous communication link with the synchronous initiating communication device 106 as described above. Similarly, the communications server 102 may convert received audio to text and pack it into one or more MQTT or webRTC messages 624, SMS or other transport mechanism. The communications server 102 may then send 626 the MQTT, webRTC, or SMS messages to the destination communication device 104. The end user of the initiating communication device 104 may, via a user interface, read the received text data 428. Upon reading, the end user of the initiating communication device 104 may opt to continue the conversation by creating a text response that may then be segmented and packed as IP data into a series of MQTT or webRTC messages 618 or even SMS text messages, for instance. Once the text data has been packed into the transport mechanism, MQTT, webRTC, SMS or otherwise, the text data may be sent 620 message by message to the communications server 102. The communications server 102 unpacks the text messages and converts the text to speech via a TTS engine 225. The speech may then be sent 622 to the destination communication device 106, 116, 118 over the established audio media channel 416. This process 630 may continue until the conversation is complete. Just as before, the conversation may continue in this manner whereby the initiating communication device 106, 116, 118 is communicating synchronously using audio with the communications server 102 while the destination communication device 104 is communicating asynchronously using text with the communications server 102. The communications server 102 mediates between the two devices converting from speech to text and text to speech when appropriate to keep the communication session going.

It should be noted that if the communication session ends, it may easily be continued at a later time being re-established by the methods described above and illustrated in FIGS. 4 through 6. Additionally, if only one endpoint's communication link(s) to the communications server 102 terminate, those communication link(s) may potentially be re-established by either the endpoint or the communications server 102 to continue the communication session. It is also noted that the asynchronous communication modalities of voice used in FIGS. 4 and 5 and text used in FIGS. 6A-B may be intermingled in a communication session whereby the asynchronous device user can adjust between text and voice modalities as needed or desired for communication efficiency.

The asynchronous communication device 104 need not be a telephonic communication device 104 but could be a more generic computer device. For example, any computing device that has IP data connectivity via 802.11 WiFi or cellular IP data can be an asynchronous communication device 104. This may include, for example, a tablet or computer with WiFi connectivity, a tablet or computer with LTE (or other cellular IP data) connectivity, a WiFi only personal digital assistant (PDA) or handheld media type device, etc. The asynchronous communication device 104 could also be any device capable of either SMS and/or MMS messaging whereby the messages are relayed through the communications server 102 as illustrated in FIGS. 4-5 for audio use cases and FIGS. 6A-B for text use cases.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the flowcharts and message diagrams of FIGS. 4-6 each show a specific order of execution, it is understood that the order of execution may differ from that which is depicted. Also, steps shown in succession in the flowcharts may be executed concurrently or with partial concurrence. Further, in some embodiments, one or more of the steps shown in the flowcharts may be skipped or omitted. In addition, any number of counters, state variables, warning semaphores, or messages might be added to the logical flows described herein, for purposes of enhanced utility, accounting, performance measurement, or providing troubleshooting aids, etc. It is understood that all such variations are within the scope of the present disclosure.

Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

A memory is defined herein as including both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may comprise additional systems designed to coordinate this communication, including, for example, performing load balancing. A processor may be of electrical or of some other available construction.

Although the various modules and other various systems and components described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic, functionality or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method of mediating a communication session comprising:
   in a communications server:
   receiving a first set of asynchronous voice messages comprised of one or more Internet Protocol (IP) data segments transmitted from a first end user communication device over a first asynchronous one-way IP communication link;
   converting the first set of asynchronous voice messages comprised of one or more IP data segments into a first stream of Voice over IP (VoIP) data packets;
   establishing an VoIP media channel between the communications server and a second end user communication device over a synchronous two-way IP communication link in response to received the first set of asynchronous voice messages;
   transmitting the first stream of VoIP data packets to the second end user communication device over the synchronous two-way IP communication link;
   receiving a second stream of VoIP data packets over the synchronous two-way IP communication link from the second end user communication device;
   converting the second stream of VoIP data packets into a second set of asynchronous voice messages comprised of one or more IP data segments; and
   transmitting the second set of asynchronous voice messages comprised of one or more IP data segments to the first end user communication device over a second asynchronous one-way IP communication link.

2. The method of claim 1, wherein transmitting the first and second set of asynchronous voice messages comprised of one or more IP data segments over the first asynchronous one-way IP communication link comprises:
   packing the one or more IP data segments into a series of Message Queuing Telemetry Transport (MQTT) messages; and
   sending the MQTT messages over the first asynchronous one-way IP communication link.

3. The method of claim 1, wherein transmitting the first and second set of asynchronous voice messages comprised of one or more IP data segments over the first asynchronous one-way IP communication link comprises:
   packing the one or more IP data segments into a series of multi-media messaging service (MMS) messages; and
   sending the MMS messages via an MMS transport mechanism.

4. The method of claim 1, wherein transmitting the first and second set of asynchronous voice messages comprised of one or more IP data segments over the first asynchronous one-way IP communication link comprises:
   packing the one or more IP data segments into a series of web real-time communication (webRTC) data channel messages; and
   sending the webRTC data channel messages over the first asynchronous one-way IP communication link.

5. The method of claim 1, wherein the VoIP media channel between the communications server and the second end user communication device is an audio media channel established using a session initiation protocol (SIP) protocol.

6. The method of claim 5, wherein establishing the VoIP media channel between the communications server and the second end user communication device over the synchronous two-way IP communication link comprises:
communication with a telecom server via SIP signaling to establish an audio media channel between the communications server and the telecom server;
in the telecom server:
converting the SIP signaling to a telecom protocol utilized by the telecom server and the second end user communication device;
establishing a connection with the second end user communication device;
establishing an audio media channel between the telecom server and the second end user communication device; and
joining the audio media channel between the communications server and the telecom server with the audio media channel between the telecom server and the second end user communication device.

7. The method of claim 1, the first and second communication links comprising an 802.11 WiFi communication links.

8. The method of claim 1, the first and second communication links comprising a cellular IP data communication link.

9. An apparatus, comprising:
a processor operable to execute one or more software modules, the software modules including instructions that when executed mediate a communication session by:
receiving a first set of asynchronous voice messages comprised of one or more Internet Protocol (IP) data segments transmitted from a first end user communication device over a first asynchronous one-way IP communication link;
converting the first set of asynchronous voice messages comprised of one or more IP data segments into a first stream of Voice over IP (VoIP) data packets;
establishing an VoIP media channel between the communications server and a second end user communication device over a synchronous two-way IP communication link in response to received the first set of asynchronous voice messages;
transmitting the first stream of VoIP data packets to the second end user communication device over the synchronous two-way IP communication link;
receiving a second stream of VoIP data packets over the synchronous two-way IP communication link from the second end user communication device;
converting the second stream of VoIP data packets into a second set of asynchronous voice messages comprised of one or more IP data segments; and
transmitting the second set of asynchronous voice messages comprised of one or more IP data segments to the first end user communication device over a second asynchronous one-way IP communication link.

10. The apparatus of claim 9, wherein transmitting the first and second set of asynchronous voice messages comprised of one or more IP data segments over the first asynchronous one-way IP communication link comprises:
packing the one or more IP data segments into a series of Message Queuing Telemetry Transport (MQTT) messages; and
sending the MQTT messages over the first asynchronous one-way IP communication link.

11. The apparatus of claim 9, wherein transmitting the first and second set of asynchronous voice messages comprised of one or more IP data segments over the first asynchronous one-way IP communication link comprises:
packing the one or more IP data segments into a series of multi-media messaging service (MMS) messages; and
sending the MMS messages via an MMS transport mechanism.

12. The apparatus of claim 9, wherein transmitting the first and second set of asynchronous voice messages comprised of one or more IP data segments over the first asynchronous one-way IP communication link comprises:
packing the one or more IP data segments into a series of web real-time communication (webRTC) data channel messages; and
sending the webRTC data channel messages over the first asynchronous one-way IP communication link.

13. The apparatus of claim 9, wherein the VoIP media channel between the communications server and the second end user communication device is an audio media channel established using a session initiation protocol (SIP) protocol.

14. The apparatus of claim 13, wherein establishing the VoIP media channel between the communications server and the second end user communication device comprises instructing the processor to establish an audio media channel between the communications server and the telecom server via SIP signaling, wherein the telecom server:
converts the SIP signaling to a telecom protocol utilized by the telecom server and the second end user communication device;
establishes a connection with the second end user communication device;
establishes an audio media channel between the telecom server and the second end user communication device; and
joins the audio media channel between the communications server and the telecom server with the audio media channel between the telecom server and the second end user communication device.

15. The apparatus of claim 9, the first and second communication links comprising an 802.11 WiFi communication links.

16. The apparatus of claim 9, the first and second communication links comprising a cellular IP data communication links.

17. At least one machine-readable non-transitory medium comprising a set of instructions executable on a computing device to cause the computing device to mediate a communication session by:
receiving a first set of asynchronous voice messages comprised of one or more Internet Protocol (IP) data segments transmitted from a first end user communication device over a first asynchronous one-way IP communication link;
converting the first set of asynchronous voice messages comprised of one or more IP data segments into a first stream of Voice over IP (VoIP) data packets;
establishing an VoIP media channel between the communications server and a second end user communication device over a synchronous two-way IP communication link in response to received the first set of asynchronous voice messages;
transmitting the first stream of VoIP data packets to the second end user communication device over the synchronous two-way IP communication link;

receiving a second stream of VoIP data packets over the synchronous two-way IP communication link from the second end user communication device;

converting the second stream of VoIP data packets into a second set of asynchronous voice messages comprised of one or more IP data segments; and transmitting the second set of asynchronous voice messages comprised of one or more IP data segments to the first end user communication device over a second asynchronous one-way IP communication link.

18. The at least one machine-readable non-transitory medium of claim 17, further comprising a set of instructions executable on a computing device to cause the computing device to:

pack the one or more IP data segments into a series of Message Queuing Telemetry Transport (MQTT) messages; and send the MQTT messages over the first asynchronous one-way IP communication link.

19. The at least one machine-readable non-transitory medium of claim 17, further comprising a set of instructions executable on a computing device to cause the computing device to:

pack the one or more IP data segments into a series of multi-media messaging service (MMS) messages; and send the MMS messages via an MMS transport mechanism.

20. The at least one machine-readable non-transitory medium of claim 17, further comprising a set of instructions executable on a computing device to cause the computing device to:

pack the one or more IP data segments into a series of web real-time communication (webRTC) data channel messages; and send the webRTC data channel messages over the first asynchronous one way IP communication link.

21. The at least one machine-readable non-transitory medium of claim 17, wherein the VoIP media channel between the communications server and the second end user communication device is an audio media channel established using a session initiation protocol (SIP) protocol.

22. The at least one machine-readable non-transitory medium of claim 21, further comprising a set of instructions executable on a computing device to cause the computing device to establish an audio media channel between the communications server and a telecom server via SIP signaling, wherein the telecom server:

converts the SIP signaling to a telecom protocol utilized by the telecom server and the second end user communication device;

establishes a connection with the second end user communication device;

establishes an audio media channel between the telecom server and the second end user communication device; and joins the audio media channel between the communications server and the telecom server with the audio media channel between the telecom server and the second end user communication device.

23. The at least one machine-readable non-transitory medium of claim 17, the first and second communication links comprising an 802.11 WiFi communication links.

24. The at least one machine-readable non-transitory medium of claim 17, the first and second communication links comprising a cellular IP data communication links.

* * * * *